Jan. 15, 1924.
B. L. VAN ORMAN
1,480,797
AUTOMATIC MACHINE CONTROL MEANS
Filed Oct. 21, 1922   12 Sheets-Sheet 1
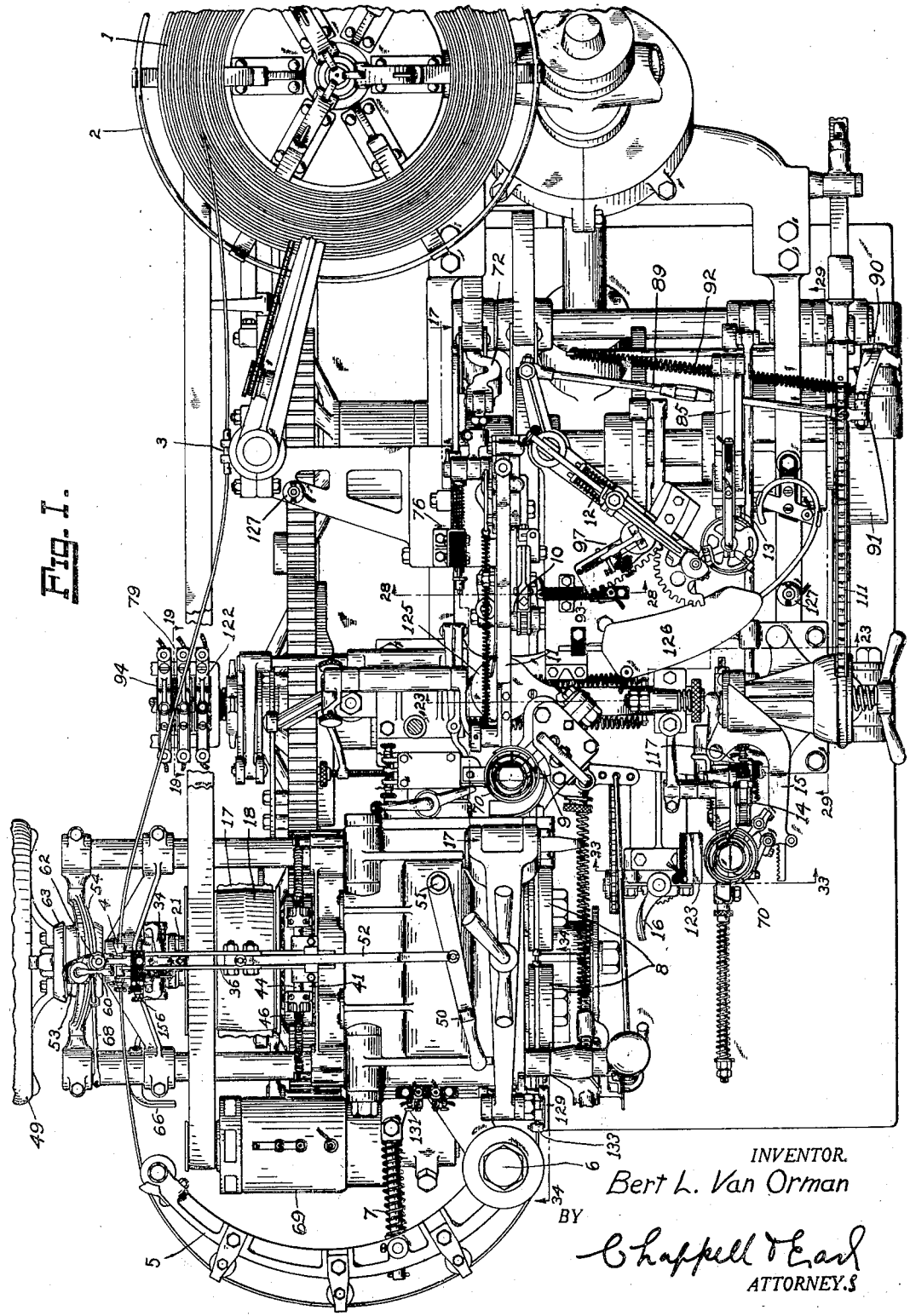
Fig. I.
INVENTOR.
Bert L. Van Orman
BY
Chappell & Earl
ATTORNEYS

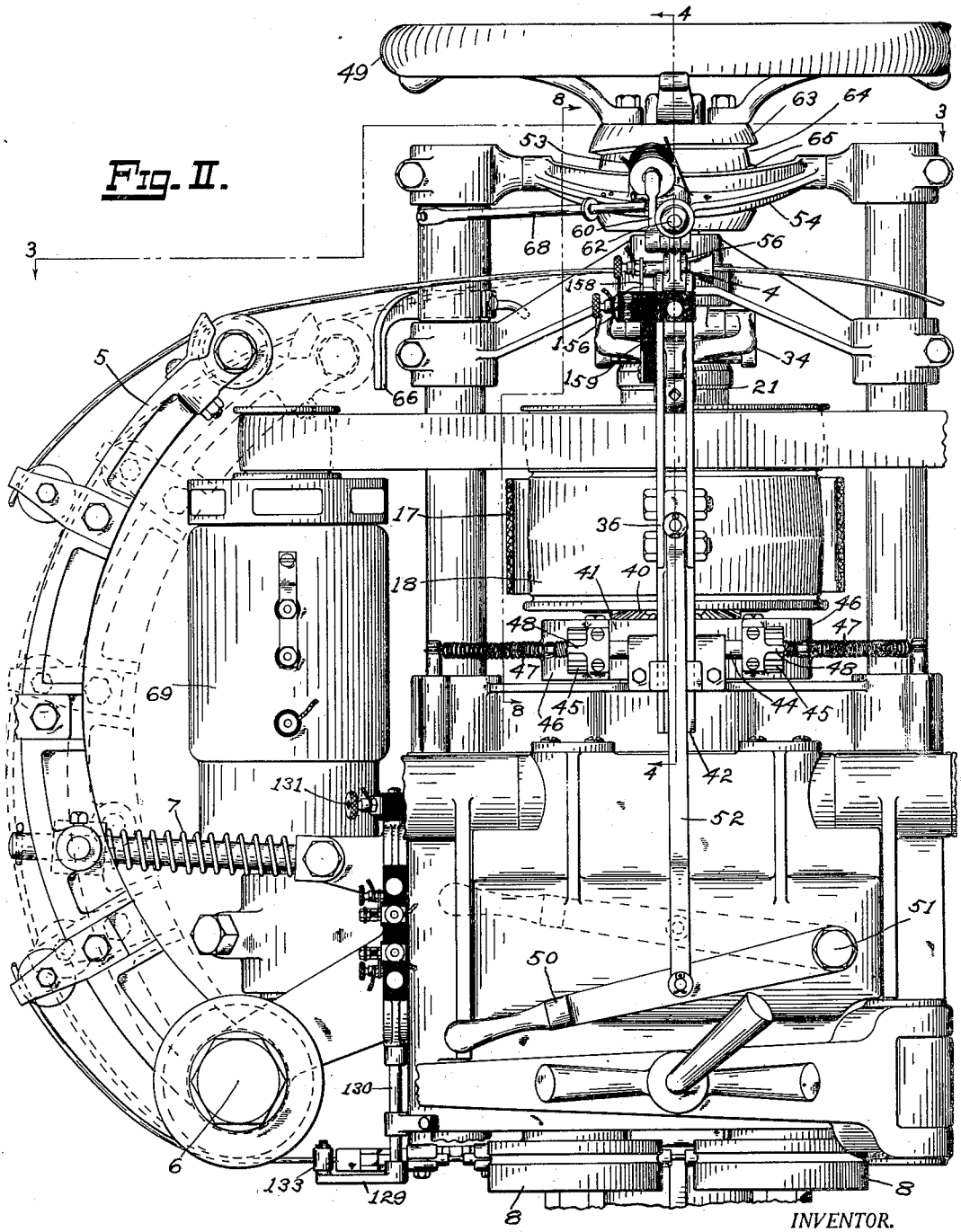

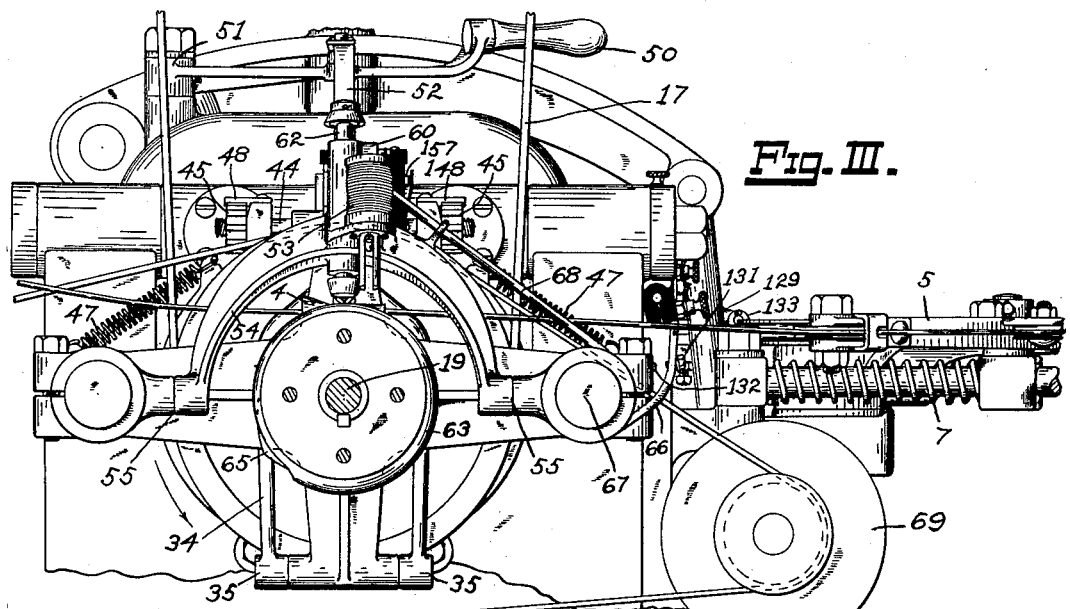
Fig. III.
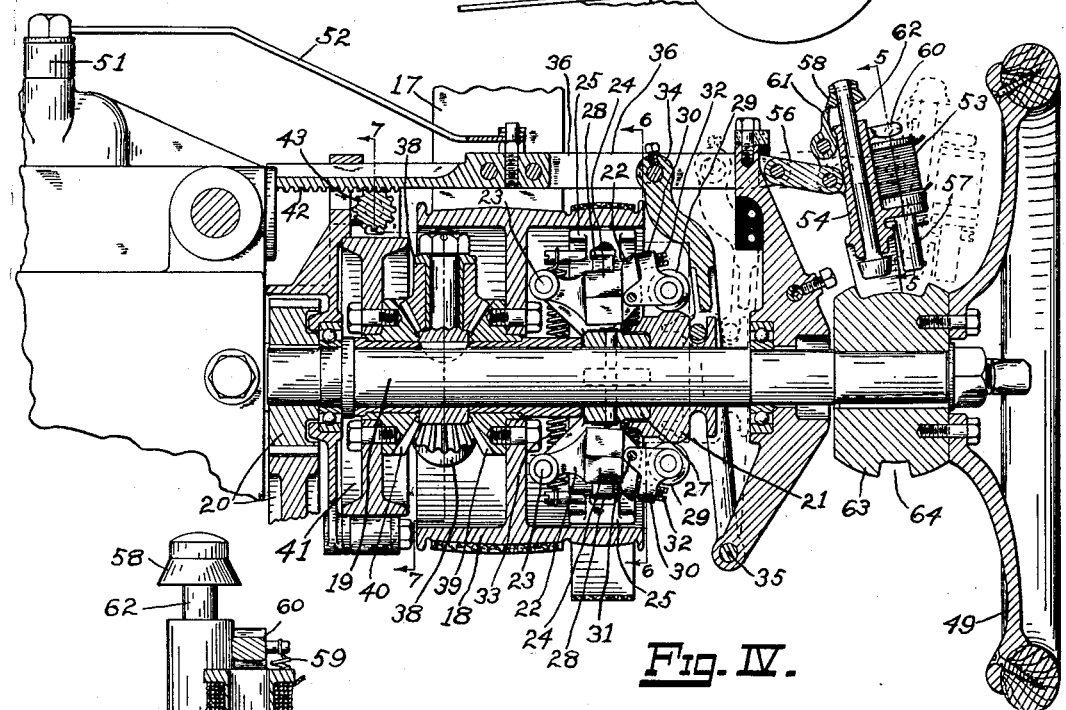
Fig. IV.
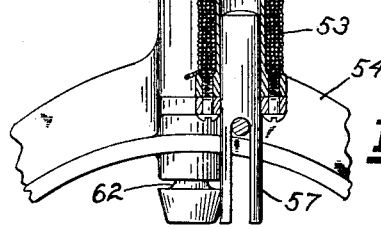
Fig. V.

Jan. 15, 1924. 1,480,797
B. L. VAN ORMAN
AUTOMATIC MACHINE CONTROL MEANS
Filed Oct. 21 1922 12 Sheets-Sheet 4
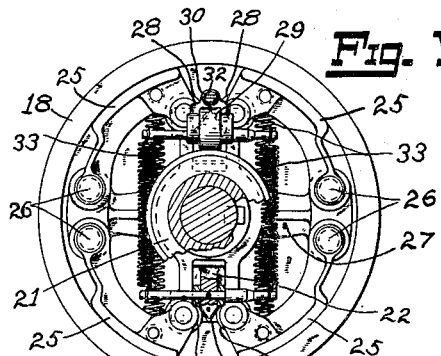
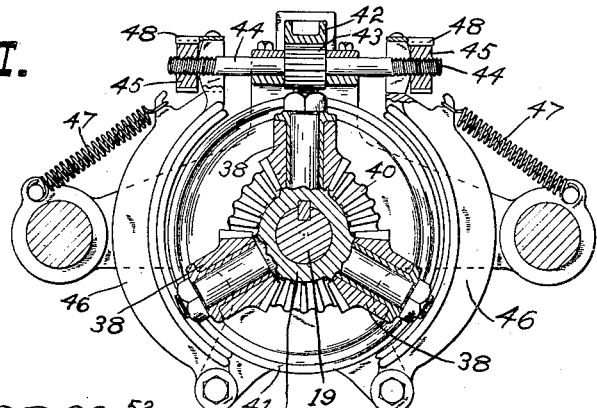
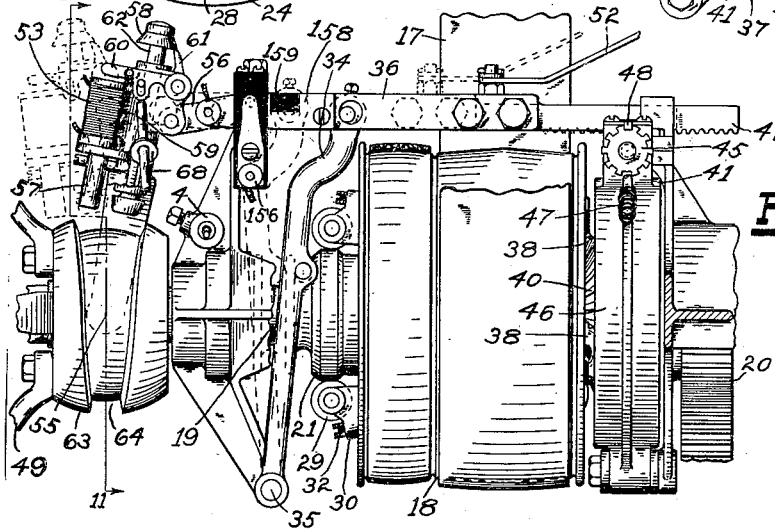
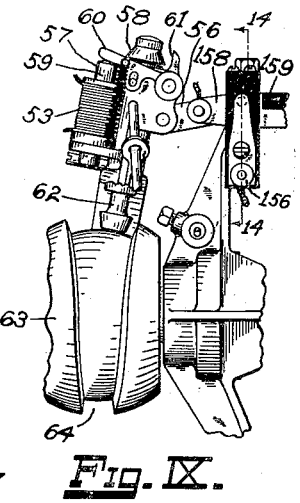
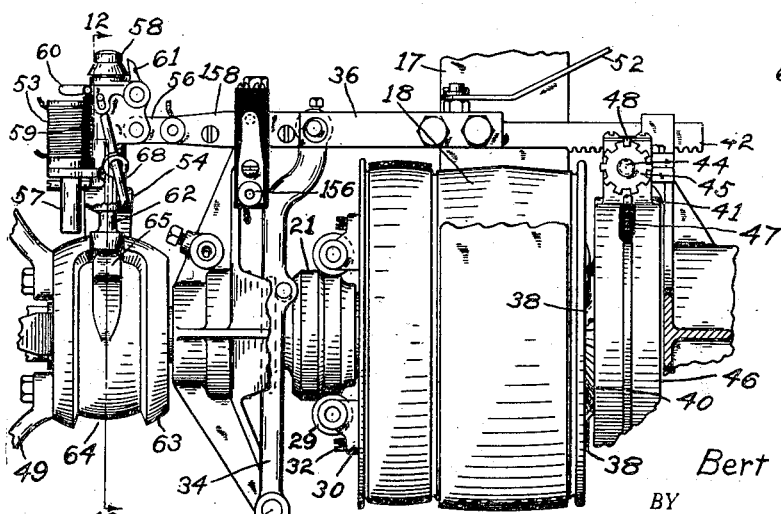
INVENTOR.
Bert L. Van Orman
BY
Chappell & Earl
ATTORNEYS

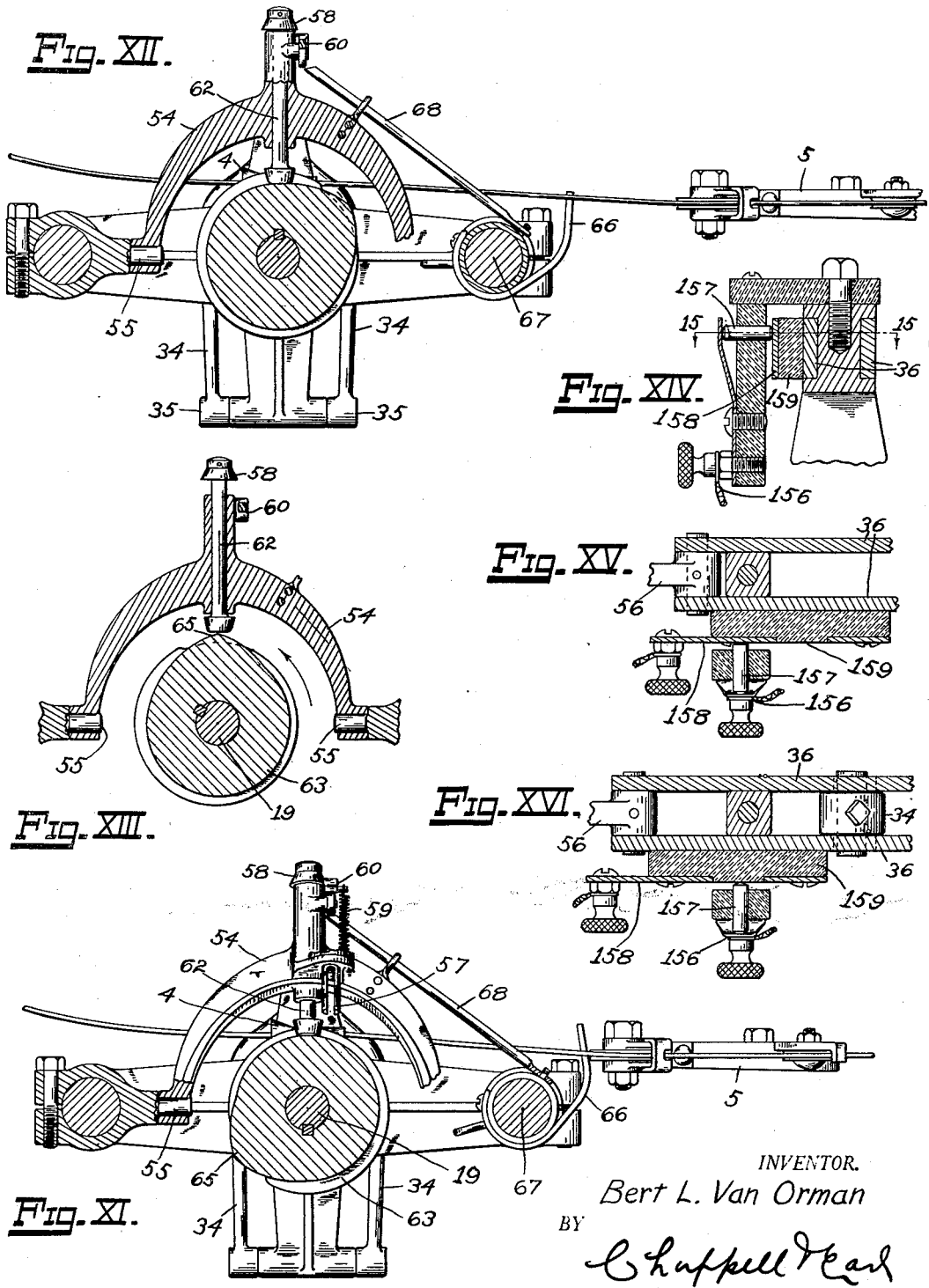

Jan. 15, 1924.
B. L. VAN ORMAN
1,480,797
AUTOMATIC MACHINE CONTROL MEANS
Filed Oct. 21, 1922  12 Sheets-Sheet 6
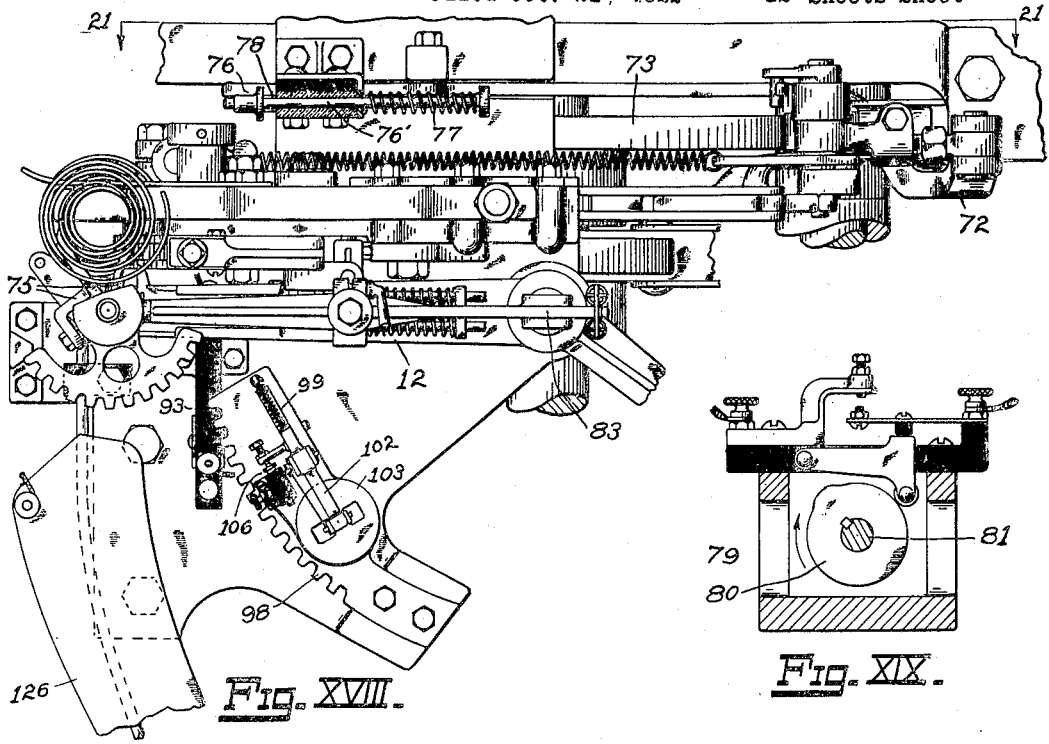
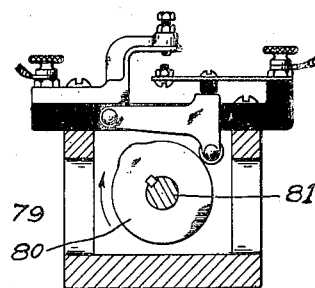
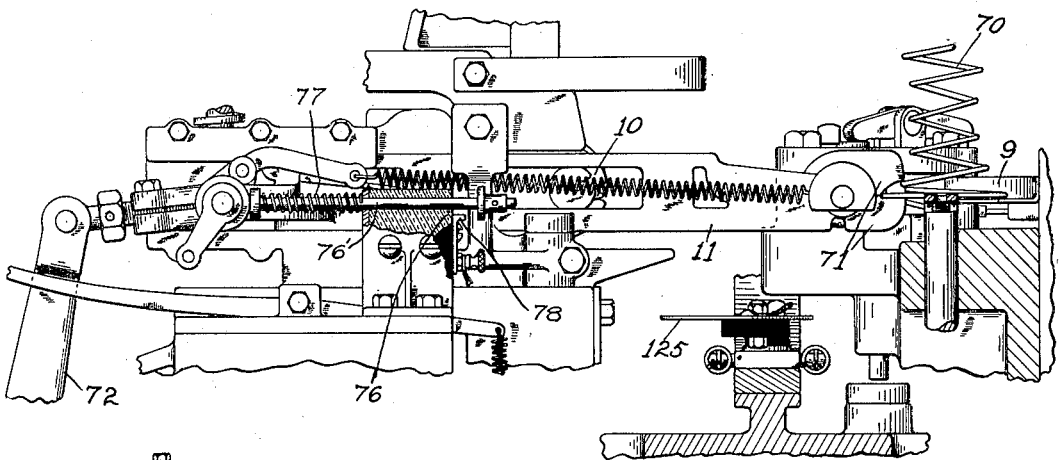
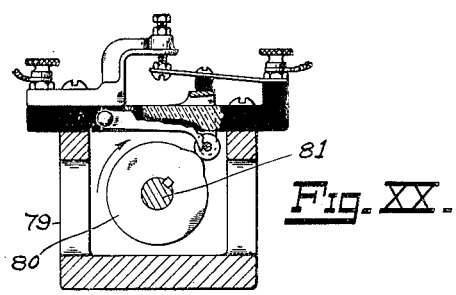
INVENTOR.
Bert L. Van Orman
BY
ATTORNEYS

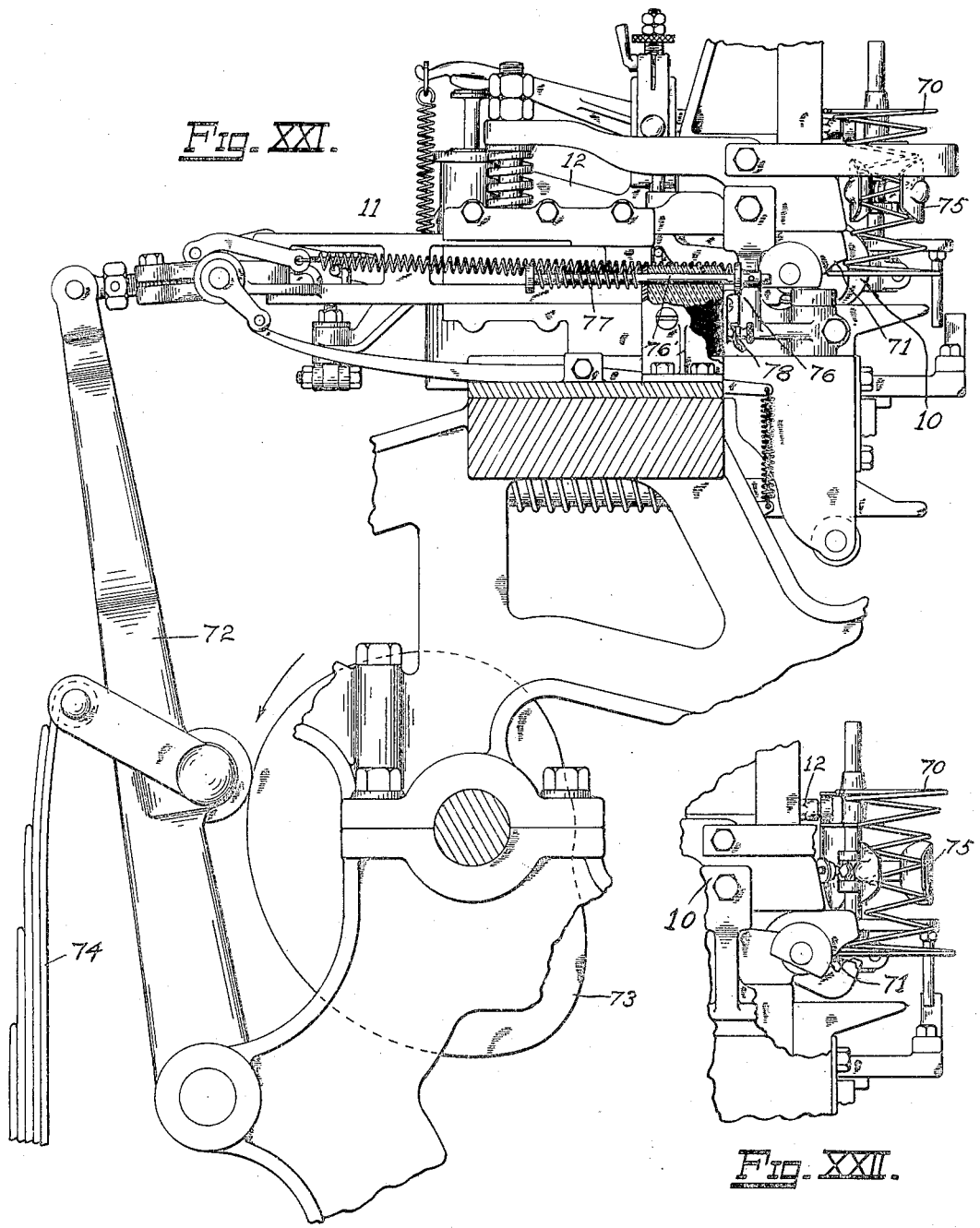

Jan. 15, 1924. 1,480,797
B. L. VAN ORMAN
AUTOMATIC MACHINE CONTROL MEANS
Filed Oct. 21, 1922 12 Sheets-Sheet 8
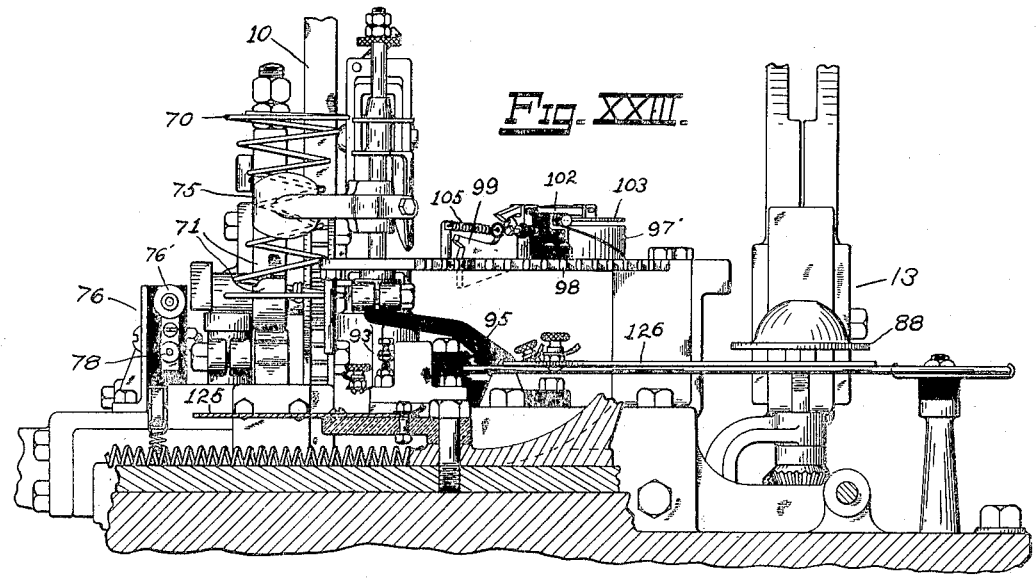
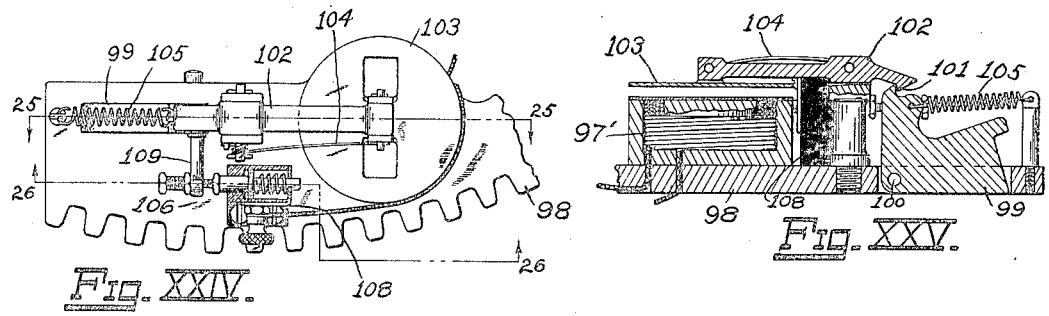
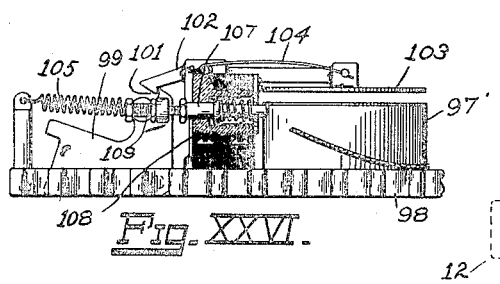
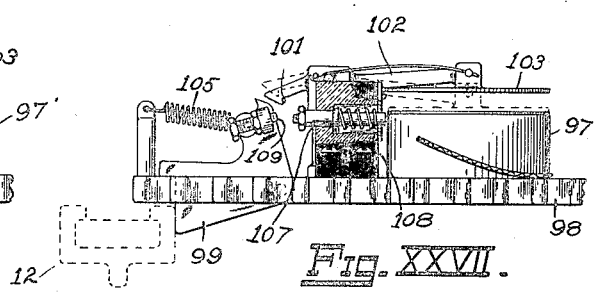
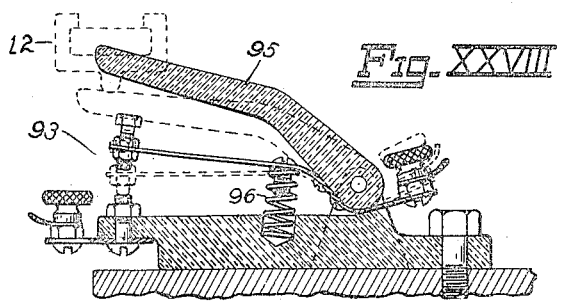
INVENTOR.
Bert L. Van Orman
BY
ATTORNEYS

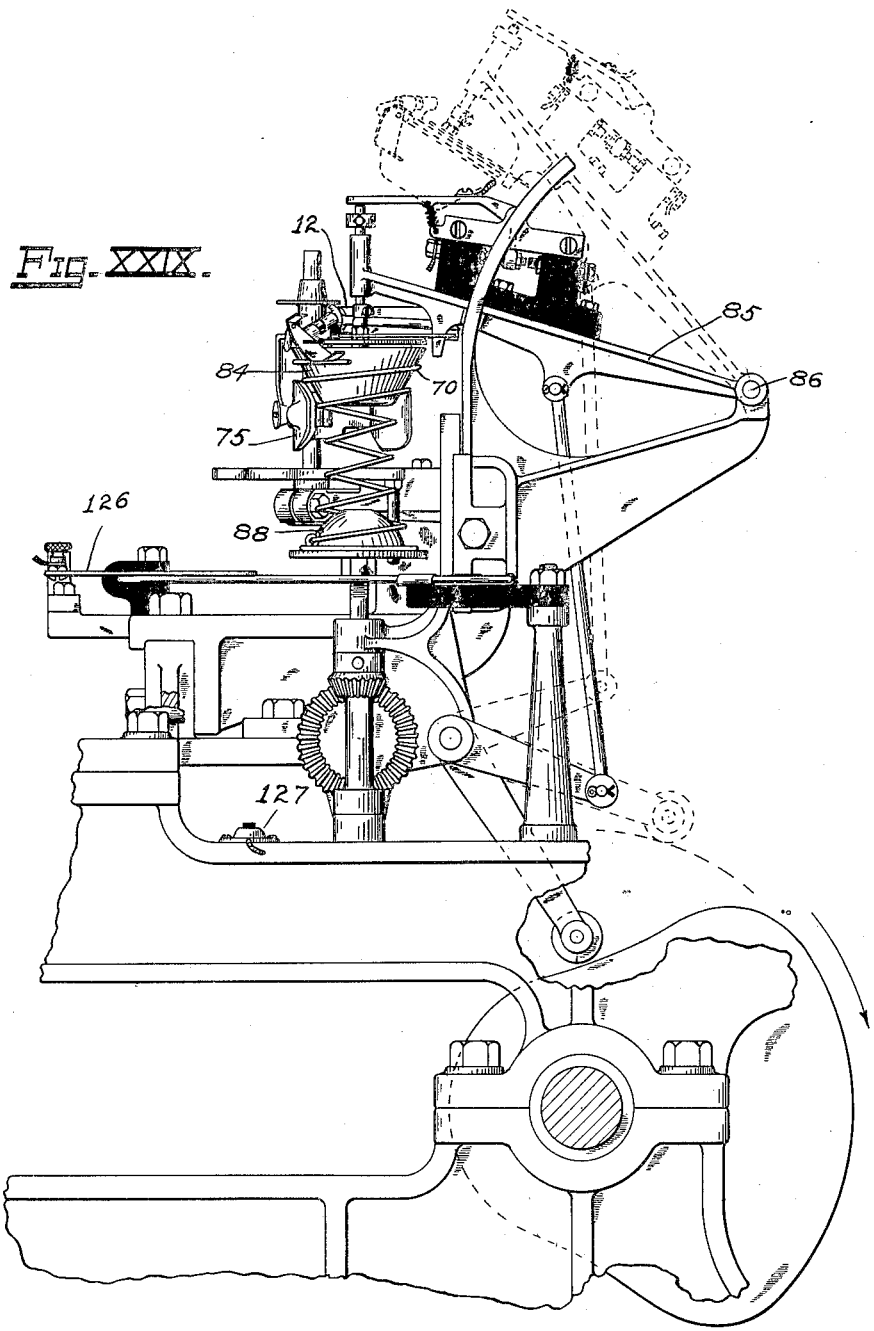

Jan. 15, 1924.
B. L. VAN ORMAN
1,480,797
AUTOMATIC MACHINE CONTROL MEANS
Filed Oct. 21, 1922    12 Sheets-Sheet 10
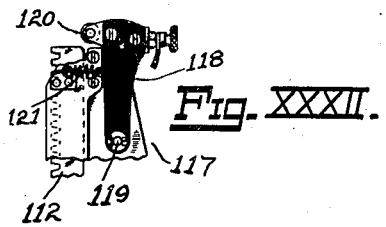
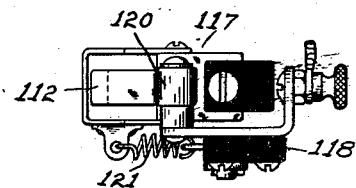
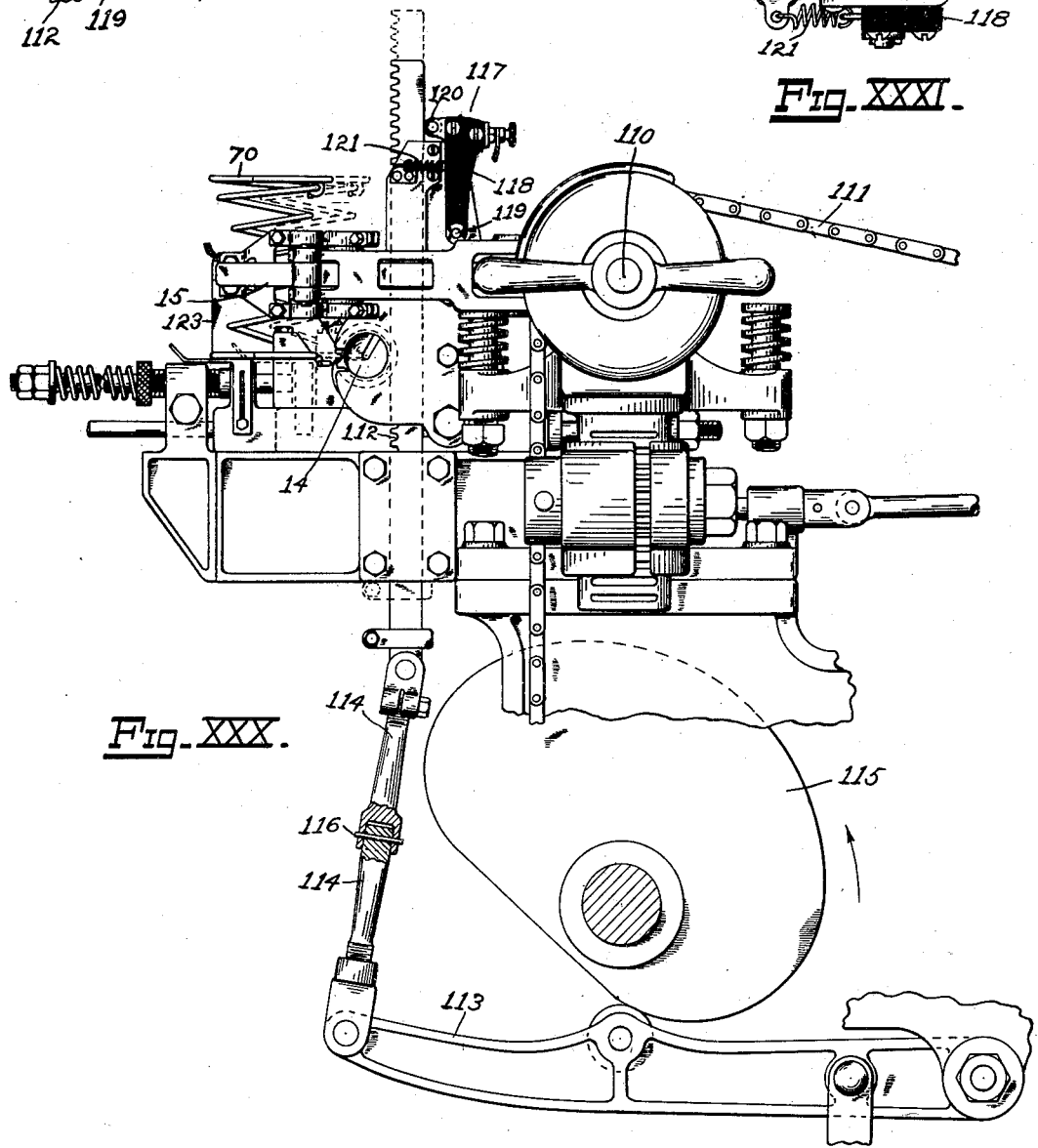
INVENTOR.
Bert L. Van Orman
BY
Chappell Earl
ATTORNEYS Jan. 15, 1924.
B. L. VAN ORMAN
1,480,797
AUTOMATIC MACHINE CONTROL MEANS
Filed Oct. 21 1922    12 Sheets-Sheet 11
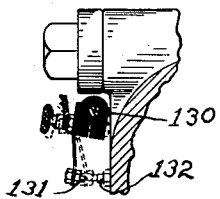
Fig. XXXVII.
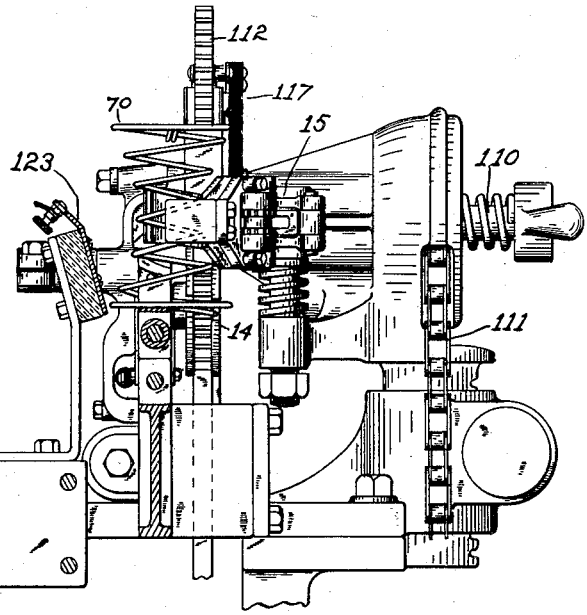
Fig. XXXIII.
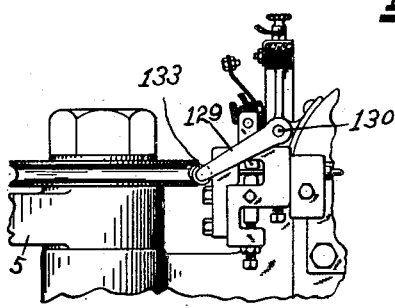
Fig. XXXVI.
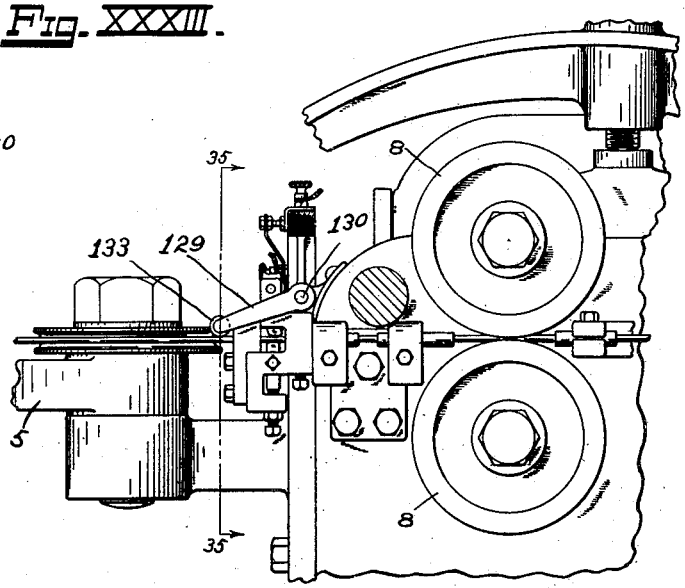
Fig. XXXIV.
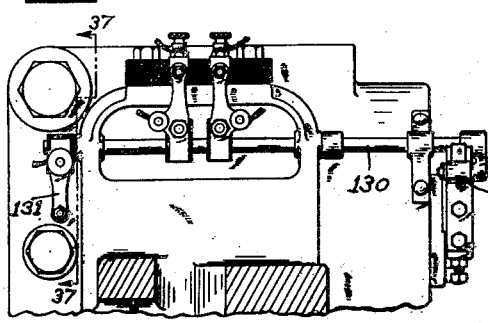
Fig. XXXV.
INVENTOR.
Bert L. Van Orman
BY
Chaffield Earl
ATTORNEYS

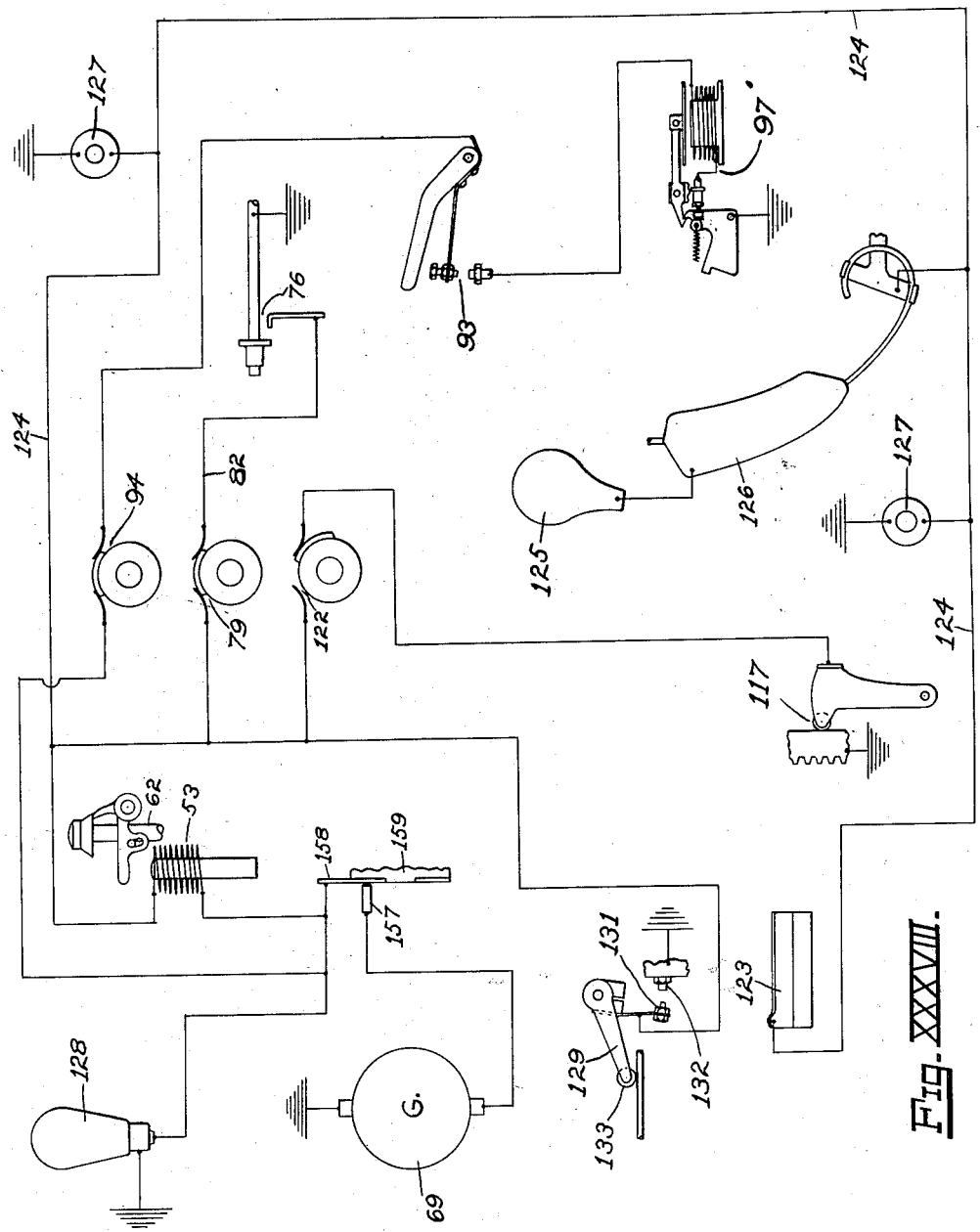

Patented Jan. 15, 1924.

1,480,797

UNITED STATES PATENT OFFICE.

BERT L. VAN ORMAN, OF DETROIT, MICHIGAN, ASSIGNOR TO L. A. YOUNG INDUSTRIES, INC., OF DETROIT, MICHIGAN.

AUTOMATIC MACHINE-CONTROL MEANS.

Application filed October 21, 1922. Serial No. 595,995.

*To all whom it may concern:*

Be it known that I, BERT L. VAN ORMAN, a citizen of the United States, residing at Detroit, county of Wayne, State of Michigan, have invented certain new and useful Improvements in Automatic Machine-Control Means, of which the following is a specification.

This invention relates to automatic machine control means actuated by abnormal conditions, to automatically disconnect the machine from its source of power, or to actuate other means of preventing injury to the machine.

In my present embodiment I have shown my invention applied to a machine for the manufacture of coiled springs such as are used in vehicle and furniture seats, mattresses, and the like. The construction and operation of this machine is fully described in my copending applications Ser. No. 474,899, filed June 2, 1921, and Ser. No. 574,846, filed July 13, 1922.

The main objects of this invention are:

First, to provide in a machine of the class described a means for automatically stopping the machine in the event of breakage of a part or the failure of a part to perform its normal functions.

Second, to provide in a machine an improved electrical control mechanism whereby the machine is automatically stopped in the case of a part falling into the machine, such as one of parts being operated upon.

Third, to provide in an automatic machine means for reducing the likelihood of injury or damage to the machine in operation.

Fourth, to provide an improved automatic machine in which the required attention of the operator is minimized.

Further objects, and objects relating to structural details will definitely appear from the detailed description to follow.

I accomplish the objects of my invention by the devices and means described in the following specification. The invention is clearly defined and pointed out in the claims.

A structure which is a preferred embodiment of my invention is clearly illustrated in the accompanying drawing, forming a part of this application, in which:

Fig. I, Sheet 1, is a general plan view:

Fig. II, Sheet 2, is an enlarged detail plan view of change speed power transmitting mechanism with manual and automatic controlling means:

Fig. III, Sheet 3, is a view partly in elevation and partly in section on a line corresponding to line 3—3 of Fig. II.

Fig. IV, Sheet 3, is a view in section on a line corresponding to line 4—4 of Fig. II, showing details of the transmission with high speed clutch engaged;

Fig. V, Sheet 3, is an enlarged view in section on a line corresponding to line 5—5 of Fig. IV, showing details of a solenoid magnet for releasing the automatic clutch controlling means:

Fig. VI, Sheet 4, is a detail view in section on a line corresponding to line 6—6 of Fig. IV, of parts of the high speed clutch;

Fig. VII. Sheet 4, is a view in section on a line corresponding to line 7—7 of Fig. IV, showing details of the low speed clutch.

Fig. VIII, Sheet 4, is a view partly in elevation and partly in section on a line corresponding to line 8—8 of Fig. II, showing further details of the clutch mechanism.

Fig. IX, Sheet 4, is a view of a part of Fig. VIII, showing the clutch releasing member released by the solenoid magnet.

Fig. X, Sheet 4, is a view similar to Fig. VIII with the parts in neutral or clutch releasing position.

Fig. XI, Sheet 5, is a view partly in section on a line corresponding to line 11—11 of Fig. VIII, illustrating a mechanical means for releasing the automatic stopping mechanism:

Fig. XII, Sheet 5, is a view partly in section on a line corresponding to line 12—12 of Fig. X.

Fig. XIII, Sheet 5, is a view similar to a part of Fig. XII showing means for automatically resetting the clutch releasing member.

Fig. XIV, Sheet 5, is an enlarged detail view of an automatic circuit breaker, in section, on a line corresponding to line 14—14 of Fig. IX.

Fig. XV, Sheet 5, is a section on a line corresponding to line 15—15 of Fig. XIV.

Fig. XVI, Sheet 5, is a view similar to Fig. XV with the parts in position to open an electrical circuit;

Fig. XVII, Sheet 6, is an enlarged view in section, on a line corresponding to line 17. 17 of Fig. I, illustrating details of the coiler and first knotter, and associated safety control mechanism.

Fig. XVIII, Sheet 6, is an enlarged detail plan of the first knotter, second transfer member, and associated safety control mechanism; moving parts of the machine being in another position from that shown in Figs. I and XVII.

Fig. XIX, Sheet 6, is an enlarged detail of an electrical timer, which is disposed in certain of the electrical circuits, the timer being shown in section, on a line corresponding to line 19—19 of Fig. I.

Fig. XX, Sheet 6, is a view similar to Fig. 19, showing parts of the timer in position to close an electrical circuit;

Fig. XXI, Sheet 7, is a view in vertical section on a line corresponding to line 21—21 of Fig. XVIII, showing further details of the control means.

Fig. XXII, Sheet 7, is a detail view illustrating a part of Fig. 21, with the knotted spring being released from the first knotter;

Fig. XXIII, Sheet 8, is an enlarged detail view in section on a line corresponding to line 23—23 of Fig. I, but with the parts in the position shown in Figs. XVIII and XXI.

Fig. XXIV, Sheet 8, is an enlarged detail plan view of an automatic stop for the second transfer arm;

Fig. XXV, Sheet 8, is a section on a line corresponding to line 25—25 of Fig. XXIV.

Fig. XXVI, Sheet 8, is a view partly in section on a line corresponding to line 26—26 of Fig. XXIV.

Fig. XXVII, Sheet 8, is a view similar to Fig. XXVI with the stop in released position;

Fig. XXVIII, Sheet 8, is an enlarged detail, in section on a line corresponding to line 28—28 of Fig. I, illustrating a circuit closing means associated with the mechanism shown in Figs. XXIV to XXVII, inclusive.

Fig. XXIX, Sheet 9, is an enlarged detail of a spring end-locating means, partly in elevation and partly in section on a line corresponding to line 29—29 of Fig. I.

Fig. XXX, Sheet 10, is an enlarged detail elevation of the second knotter and third transfer arm;

Fig. XXXI, Sheet 10, is an enlarged plan of a part of Fig. XXX, showing details of a safety circuit control mechanism, shown at the top of Fig. XXX.

Fig. XXXII, Sheet 10, is a detail plan view illustrating a portion of Fig. XXX with parts in another position.

Fig. XXXIII, Sheet 11, is an enlarged view in section on a line corresponding to line 33—33 of Fig. I, showing further details of the parts shown in Fig. XXX.

Fig. XXXIV, Sheet 11, is an enlarged detail taken from a line corresponding to line 34—34 of Fig. I, showing means of automatically stopping the machine when the supply of wire is exhausted.

Fig. XXXV, Sheet 11, is a detail section taken from a line corresponding to line 35—35 of Fig. XXXIV.

Fig. XXXVI, Sheet 11, is a view similar to Fig. XXXIV showing the parts in position to stop the machine.

Fig. XXXVII, Sheet 11, is a detail taken from a line corresponding to line 37—37 of Fig. XXXV.

Fig. XXXVIII, Sheet 12, is a diagram of the electrical circuits for controlling the automatic stopping mechanism.

In the drawing similar reference characters refer to similar parts throughout the several views and the sectional views are taken looking in the direction of the little arrows at the ends of the sectional lines.

Referring to the drawing, the operation of the machine which, as stated, is adapted for the making of coiled springs for use in upholstery, mattresses and the like, is in general as follows:

The wire is drawn from a stock bale 1 carried by a reel 2. The details of the mechanism for controlling the reel and details for various other parts of the machine are not fully illustrated and described as such details form no part of this invention, it having been my purpose to illustrate the mechanism with only sufficient detail to show a practical embodiment and adaptation of my improvements.

The wire is fed from the reel through suitable guides 3 and 4, to a tension arm 5 which is pivoted at 6 and yieldingly supported by means of the coiled spring 7. From the tension arm, the wire passes to the feed rollers 8 by which it is delivered to the coiling mechanism, designated generally by the numeral 9. After coiling the spring is carried to the first knotter, designated generally by the numeral 10, by means of the reciprocating transfer arm 11. This first knotter forms the bottom knot or ties the bottom coil and the spring is then transferred, by the swinging transfer arm 12, to the gaging and positioning device, designated generally by the numeral 13. The spring is transferred from this positioning and gaging device to the second knotter, designated generally by the numeral 14, by the transfer arm 15 which inverts the spring during its transfer bringing its other end into coacting relation to the knotter 14. After the operation of this knotter 14 on the spring the spring is ejected from the machine by means of the rotating ejector 16. Details of the knotting and transfer engaging means are shown and claimed in my application for Letters Patent hereinbefore referred to. The several mechanisms being illustrated and their operating means and connections being described in these applications I deem it unnecessary to illustrate and describe such details herein further than they have directly to do with my present invention.

Power is delivered to the machine by any suitable means as by a belt 17 and pulley 18. The pulley revolves at a constant and uniform speed, but through the medium of a transmission the machine may be driven at either of two different speeds or may be disconnected from the driving pulley. The construction of the transmission of one embodiment of my invention, and its controlling means, is illustrated in detail in Figs. 2 to 16 inclusive.

A driven shaft 19, (see Fig. IV) which is operatively connected with working parts of the machine through a suitable train of gears 20, serves as a shaft for the driving pulley 18, and other revolving members of the transmission. When the parts are in the positions shown in Figs. IV and VIII, a cone 21, free to slide endwise upon the driven shaft, has been moved into position to spread apart the levers 22, pivoted at 23, causing the wedges 24 to spread and expand the clutch shoes 25 into frictional engagement with the inside surface of the driving pulley. See Fig. VI. These clutch shoes 25, are pivoted at 26 on the spider 27 keyed to the shaft 19, and are provided with rollers 28 which engage the wedges 24. The brake levers 22 are provided with rollers 29 coacting with the cone 21.

These rollers 29 are mounted on the supports 30 which are pivoted on the levers at 31 and adjusted by means of the adjusting screws 32. This provides for adjusting for wear and also in assembling.

The clutch shoes are normally held out of engagement by springs 33. The spider 27, which carries the clutch shoes as described, being keyed to the shaft 19; the parts revolve together as a unit for direct drive or high speed. The position of the cone 21, is controlled by a yoke 34 pivoted at 35 and actuated by the sliding bar 36.

When the cone 21 has been moved to the position shown in Fig. 10, the clutch shoes 25, are disengaged from the pulley 18.

A spider 37 carrying the planetary pinions 38 (see Fig. VII) is keyed to the shaft 19. A gear 39 is secured to the pulley 18 to coact with these planetary pinions 38. A gear 40 on the clutch drum 41 also coacts with the planetary pinions. (See Fig. IV).

When the cone 21 and yoke 34 are in the position shown by dotted lines in Figs. 4 and 8, the slide bar 36 has been moved outwardly far enough to cause a rack 42 to rotate a pinion 43 on the shaft 44, a sufficient amount to cause oppositely disposed threads running in nuts 45 to contract shoes 46 upon the clutch drum 41. This action holds the drum 41 and gear 40 stationary and compels the spider 37 carrying the planetary pinions to rotate the shaft 19 at half the speed of the driving pulley. The clutch shoes 46 are normally held out of engagement by springs 47. Spring detents 48 are provided to adjustably hold the nuts 45.

A hand wheel 49 is secured to the outer end of the driven shaft 19 so that the machine may be manually operated slowly in setting up or trying out parts of the machine.

The transmission is manually controlled by a hand lever 50 pivoted at 51 and connected to the slide bar 36 by a link 52. In addition, the transmission may automatically be thrown into neutral by the following described mechanism;

A solenoid magnet 53 is mounted upon a yoke or lever 54 pivoted at 55 and connected to the slide bar 36 by the link 56 so that movement of the yoke shifts or actuates the bar and through it controls the transmission. When the solenoid magnet 53 is energized by an electrical current, the armature 57 is lifted as shown in Fig. IX striking a bell crank lever 60 a hammer blow, thereby swinging a latch 61 to allow a bolt 62 to drop into engagement with an actuating face of a cam 63. The latch 61 is normally held in engagement with the head 58 by a spring 59 attached to the bell crank 60. The cam has a continuous groove 64 about its periphery, the groove being wide enough, for a major portion of its length, to receive the lower enlarged end of the bolt 62 when the slide bar 36 is in position to engage either the high or the low speed clutch of the transmission. (See Figs. IV, VIII, and IX.) The groove 64 is considerably narrower for a small part of its length so that when the bolt 62 drops into the groove rotation of the cam swings the yoke and through the connections described actuates the lever 34 to disengage the driving clutch shoes thereby neutralizing the transmission. (See Fig. X.) The bottom of the groove 64, has a high spot 65 so that after neutralizing the transmission, continued rotation of the cam lifts the bolt 62 high enough to be caught and held again by the latch 61. (See Figs. XII and XIII.)

An automatic circuit breaker is in circuit with the solenoid magnet 53 to open the circuit as soon as the solenoid has completed its work. See Figs. VIII, IX and X and Figs. XIV, XV and XVI. When the transmission is engaged in either speed, an electrical terminal 156 mounted on a stationary part of the machine and insulated therefrom, is electrically connected by a contact 157 and the contact plate 158 to another terminal carried by the plate 158. The contact plate 158 is carried by an insulating block 159 carried by the bar 36. See Figs. VIII, IX, XIV, XV and XXXVIII. When the slide bar 36 is moved to neutral position, the contact 157 is brought into engagement with a portion of the block 159 thereby breaking the electrical connection between the terminals. See Fig. XVI.

Means are provided to release the bolt 62 mechanically and independently of the solenoid magnet 53. A lever 66 pivoted on a cross rod 67 of the frame, projects into the path of the tension arm 5. If the supply wire becomes tangled in the reel 1, or for any reason fails to feed freely, the tension arm is pulled back against its spring 7 striking the lever (see Fig. II) thereby causing the push rod 68, connected to the lever, to move upwardly and actuate the bell crank lever 60. Means can be provided to enable other abnormal conditions to release the mechanism mechanically.

Having described means by which the solenoid magnet may cause the machine to be disconnected from its source of power, I shall now follow up the operation of the machine and show, at the several points, where I have guarded against trouble, means for closing an electrical circuit to throw the safety means into action, the relation of the different parts in the several electrical circuits is shown diagrammatically in Fig. XXXVIII. Any suitable source of electricity can be used. I have shown a generator 69, (see Fig. II) one terminal of which is grounded, to provide a convenient means of closing the several circuits.

After being coiled, the spring 70 is gripped by jaws 71 of the transfer arm 11 and drawn into engagement with the first knotter 10, where the lower free end of the coil is wrapped about an adjacent turn of the coil as before mentioned. (See Figs. XVIII, XXI and XXIII.) The transfer arm 11 is reciprocated to carry the spring to the knotter 10 by the rock arm 72 actuated by the cam 73. (See Fig. XXI.) As soon as the knotting operation is completed spring 74 normally swings the lever 72 back, pushing the transfer arm out of the knotter, (see Fig. XXII) and ejecting the knotted spring to a position to be removed from the open jaws by the grippers 75 of the second transfer arm 12. A circuit breaker 76, is held normally closed by a coiled spring 77, except when the transfer arm 11 is at its extreme outward position. (See Fig. XVII.) With the transfer arm in this extreme position, the circuit breaker 76' is pushed through its supporting member, breaking its engagement with the contact 78. A timer designated generally by the numeral 79, shown in open position in Fig. XIX and closed in Fig. XX, is in circuit with the circuit breaker contact 78 and the solenoid magnet 53. The cam 80 is secured to a shaft 81 that rotates in timed relation to other moving parts of the machine. With the transfer arm 11 working properly, the circuit 82, (see Fig. XXXVIII) is closed by the timer only during the period when the circuit breaker 76 is held open by the transfer arm 11. Therefore, under normal working conditions, the circuit is never simultaneously closed at both points. However, if the transfer arm should become lodged in the knotter or if for any reason the jaws 71 should fail to return to the coiler 10, at the correct time, the circuit breaker 76 would remain closed during the closing period of the timer, thereby completing the entire circuit, energizing the solenoid magnet 53 and causing the machine to be immediately stopped.

The coiled spring 70 is taken from the first knotter by the grippers 75 of the second transfer arm 12, which is pivoted at 83, and delivered to the revolving gauging and positioning device 13. (See Figs. XXIII and XXIX.) The upper locating cone 84, of this device, is supported by a lever 85 pivoted at 86. While the spring 70 is being deposited upon the revolving seat 88, the upper cone 84 is raised to the position shown by dotted lines in Fig. XXIX. Almost simultaneously with the dropping of the spring 70 upon the seat 88, the locating cone 84 is let down into engagement with the upper coils. The transfer arm 12 is swung toward the first knotter by connecting rod 89, cam lever 90, and cam 91 (see Fig. I) movement in the opposite direction being effected by a coil spring 92 attached to the cam lever at one end, with the other end anchored to a part of the frame. The grippers 75 of the second transfer arm 12, grasp the coiled spring before it is free from the first knotter.

If the spring should become lodged in the knotter, the second transfer arm would be unable to leave the knotter by reason of the grippers 75 firmly holding to the coiled spring. When the time came for the spring 70 to be deposited on the locator seat, the grippers would loosen their hold upon the lodged spring, allowing the second transfer arm to leave the knotter. Since the cam 91 would be in position to allow the grippers to reach the locator, the pull of the cam lever spring 92 would swing the end of the transfer arm against the locator with great momentum possibly inflicting considerable damage upon the upper cone 84 which would be in its lowered position at that time. To guard against this danger, I have provided the following mechanism: Similarly to the arrangement used to safeguard the first transfer arm, an automatic circuit breaker, designated generally by the numeral 93 and shown in detail in Fig. 28, is in circuit with and in timed relation to a timer 94. (See Fig. XXXVIII.) While the second transfer arm 12, is adjacent to the knotter it holds down the lever 95 of the circuit breaker, thereby closing the circuit at this point. (See dotted lines in Fig. XXVIII.) Whenever the transfer arm is away from the knotter, the circuit at this point is held open by the spring 96. Shortly after the circuit breaker is normally allowed to open, contact is made in the timer. If the circuit breaker 93 is held closed at this time, by reason of the transfer arm 12 being unable to get away from the knotter, contact is simultaneously made in the timer, and the circuit breaker, energizing an electromagnet 97′ which forms a part of the mechanism and is shown in detail in Figs. 24 to 27 inclusive, the mechanism being designated generally in Fig. XXXVIII by the numeral 97′. This mechanism is mounted upon the segmental gear 98 beneath which the transfer arm 12 must swing. Normally a stop latch 99 pivoted at 100 is held above the path of the transfer arm by the hooked end or detent 101 on a lever 102, (see Fig. XXVI) the other end of the lever carrying the armature 103 of the electromagnet. The lever 102 is normally held down by a spring 104. When the armature is actuated (see dotted lines in Fig. XXVII), the stop 99 is released and is projected downwardly by the pull of a spring 105 into the path of the transfer arm 12 (see Fig. XXVII). When the transfer arm 12 finally releases itself from the knotter, it can swing only as far as the stop 99. Thus damage to the locator is prevented. After passing through the electromagnet 97, the electrical current must pass through an automatic circuit breaker 106 before being grounded. This circuit breaker consists of the yielding contact 107 mounted in a stationary insulated box 108 and the contact 109 secured to the pivoted stop 99. Dropping of the stop breaks the circuit (see Fig. XXVII) thereby preventing a continued passage of current through the solenoid magnet 97′. After the machine has been put back in order, the stop 99 may be reset by hand.

The third transfer arm 15, as stated, carries the spring from the locator to the second knotter, inverting the spring and bringing its bottom coil into engagement with the second knotter 14. This transfer arm is pivoted at 110 and is operated by a mechanism including the chain 111, the details of the mechanism not being illustrated, but it is understood that the actuation is properly timed with the actuation of other parts. The knotter 14 is driven through the reciprocating rack 112 being connected to the lever 113 by the link 114. This lever is actuated by the cam 115. The link is formed of sections connected by a shear pin 116 so that in the event of the parts becoming locked or set, or undue stress being placed thereon which would be likely to cause breakage, this shear pin will break, thereby preventing breakage of the machine.

At each actuation of the rack, the circuit closing means, designated generally by the numeral 117, is actuated. (See the diagrammatic view Fig. XXXVIII and Figs. XXX, XXXI, and XXXII). This comprises a swinging arm 118 of insulating material pivoted at 119 and carrying a roller 120 traveling against the rear side of the rack 112, being held yieldingly forward by the coiled spring 121, the rack forming a ground for the circuit. When the rack is at the lower end of its stroke it passes from contact with the roller 120 carried by the arm, thereby breaking the circuit. A timer is provided in this circuit performing the functions of the timers 79 and 94, previously described, that is, the circuit is momentarily broken by the mechanism 117 in normal operation. Should the parts associated with this circuit mechanism be defective or inoperative for any cause, as for instance, the breaking of the pin 116, the rack would remain in an elevated position so that the circuit could not be broken and the closing of the circuit in the timer would stop the machine.

Adjacent the second knotter 14 is a contact plate 123 which is connected in a circuit with certain other contact plates to be described. In the event that a spring is not positioned or carried by the third transfer arm in proper position for the second knotter to act thereon, the spring will engage the contact plate 123 thereby grounding the same through the spring and closing the circuit 124 which is connected to the solenoid 53 to which the several timers described are also connected, as shown in the diagram Fig. XXXVIII.

Referring also to diagrammatic view Fig. XXXVIII and Fig. I, it will be noted that I provide contact plates 125 and 126. The contact plate 125 is positioned so that in the event of the dropping of a spring from the coiling mechanism or from the transfer arm 11 it will fall on this plate and the spring contacting with some part of the machine will close the circuit 124. The plate 126 is positioned so that a spring dropping from the second transfer arm or the locator will close a circuit.

I also provide this circuit 124 with push buttons 127 located at convenient positions about the machine so that the machine can be stopped by the operator from different positions should the occasion require. A pair of push buttons is illustrated but it will be understood that as many may be employed as desired. A lamp 128 is connected in series to indicate when the circuit is in working order.

The wire also serves as a control means, that is, in the event of the supply of wire running out, the machine is automatically stopped. This I accomplish by means of a pivoted arm 129 on the rock shaft 130 which carries a contact 131 coacting with a contact 132 grounded in the machine. The arm 129 is provided with a roller 133 which travels on the wire, the arm being positioned so that it falls by gravity to close the circuit when the wire passes from under it. (See Figs. XXXIV to XXXVIII, inclusive).

With this arrangement of parts the machine is automatically stopped in the event of any part becoming inoperative or failing to perform its function. This not only prevents breakage but it also prevents clogging of the machine and consequent loss of material and labor in removing parts which have not had the necessary operations performed thereon and taken their normal course through the machine.

Having thus described my invention, what I claim as new and desire to secure by Letters Patent, is:

1. The combination with a spring coiling machine comprising a wire feed means including a wire tensioning member, a coiling means, first and second knotters, a locating means between said first and second knotters, a transfer member for transferring the springs from said coiler to said first knotter, a transfer member for transferring the springs from the first knotter to said locator and transfer member for transferring the springs from said locator to said second knotter, of means for driving the said mechanisms including a clutch, an electrically actuated control means therefor, a control circuit, contact plates connected to said control circuit and disposed in such relation to said coiler, knotters, locator and transfer members that a dislocated spring will coact therewith to close the said circuit, a circuit closing means connected to said control circuit and arranged to be held normally open by the wire passing to the machine so that when the wire is exhausted the circuit closing means is actuated, independent circuit closing means operatively associated with said first and second transfer members connected to said control circuit, the connections having control timers therein, an electromechanical stop means for said second transfer member connected to the circuit breaker associated therewith whereby when such circuit is closed, the stop is actuated to position to coact with said transfer member, a circuit closing member operatively associated with the second knotter and independently connected to said control circuit, its said connection having a timer therein, and a clutch control member operatively associated with said wire tensioning member whereby the clutch is disengaged by excessive stress upon the wire.

2. The combination with a spring coiling machine comprising a coiling means, first and second knotters, a locating means between said first and second knotters, a transfer member for transferring the springs from said coiler to said first knotter, a transfer member for transferring the springs from the first knotter to said locator, and transfer member for transferring the springs from said locator to said second knotter, of means for driving the said mechanisms including a clutch, an electrically actuated control means therefor, a control circuit, contact plates connected to said control circuit and disposed in such relation to said coiler, knotters, locator and transfer members that a dislocated spring will coact therewith to close the said circuit, independent circuit closing means operatively associated with said first and second transfer members connected to said control circuit, the connections having control timers therein, an electromechanical stop means for said second transfer member connected to the circuit breaker associated therewith whereby when such circuit is closed the stop is actuated to position to coact with said transfer member, a circuit closing member operatively associated with the second knotter and independently connected to said control circuit, its said connection having a timer therein.

3. In a combination with a spring coiling machine comprising a wire feed means including a wire tensioning member, a coiling means, first and second knotters, a locating means between member for transferring the springs from said coiler to said first knotter, a transfer member for transferring the springs from the first knotter to said locator, and transfer member for transferring the springs from said locator to said second knotter, of means for driving the said mechanisms including a clutch, an electrically actuated control means therefor, a control circuit, a circuit closing means connected to said control circuit and arranged to be held normally open by the wire passing to the machine so that when the wire is exhausted the circuit closing means is actuated, independent circuit closing means operatively associated with said first and second transfer members connected to said control circuit, the connections having control timers therein, an electromechanical stop means for said second transfer member connected to the circuit breaker associated therewith whereby when such circuit is closed the stop is actuated to position to coact with said transfer member, a circuit closing member operatively associated with the second knotter and independently connected to said control circuit, its said connection having a timer therein, and a clutch member operatively associated with said wire tensioning member whereby the clutch is disengaged by excessive stress upon the wire.

4. The combination with a spring coiling machine comprising a coiling means, first and second knotters, a locating means between said first and second knotters, a transfer member for transferring the springs from said coiler to said first knotter, a transfer member for transferring the springs from the first knotter to said locator, and transfer member for transferring the springs from said locator to said second knotter, of means for driving the said mechanisms including a clutch, an electrically actuated control means therefor, a control circuit, independent circuit closing means operatively associated with said first and second transfer members connected to said control circuit, the connections having control timers therein, an electromechanical stop means for said second transfer member connected to the circuit breaker associated therewith whereby when such circuit is closed the stop is actuated to position to coact with said transfer member, a circuit closing member operatively associated with the second knotter and independently connected to said control circuit, its said connection having a timer therein.

5. The combination with a spring coiling machine comprising a wire feed means including a wire tensioning member, a coiling means, knotters, and transfer members for transferring the springs step by step, of driving means including a clutch, a control means for said clutch including an electrically actuated member, a control circuit for said electrically actuated member, contact plates connected to said control circuit and disposed in such relation to said coiler, knotters and transfer members that a dislocated spring will coact therewith to close the said circuit, a circuit closing means connected to said control circuit and arranged to be held normally open by the wire passing to the machine so that when the wire is exhausted the circuit closing means is actuated, independent circuit closing means operatively associated with said transfer members connected to said control circuit, the connections having control timers therein, a stop means for one of said transfer members connected to the circuit breaker associated therewith whereby when such circuit is closed the stop is actuated to position to coact with said transfer member, a circuit closing member operatively associated with one of the knotters and connected to said control circuit, its said connection having a timer therein, and a clutch control member operatively associated with said wire tensioning member whereby the clutch is disengaged by excessive stress upon the wire.

6. The combination with a spring coiling machine comprising a coiling means, knotters, and transfer members for transferring the springs step by step, of driving means including a clutch, a control means for said clutch including an electrically actuated member, a control circuit for said electrically actuated member, contact plates connected to said control circuit and disposed in such relation to said coiler, knotters and transfer members that a dislocated spring will coact therewith to close the said circuit, independent circuit closing means operatively associated with said transfer members connected to said control circuit, the connections having control timers therein, a stop means for one of said transfer members connected to the circuit breaker associated therewith whereby when such circuit is closed the stop is actuated to position to coact with said transfer member, a circuit closing member operatively associated with one of the knotters and connected to said control circuit, its said connection having a timer therein.

7. The combination with a spring coiling machine comprising a wire feed means including a wire tensioning member, a coiling means, knotters, and transfer members for transferring the springs step by step, of driving means including a clutch, a control means for said clutch including an electrically actuated member, a control circuit for said electrically actuated member, a circuit closing means connected to said control circuit and arranged to be held normally open by the wire passing to the machine so that when the wire is exhausted the circuit closing means is actuated, independent circuit closing means operatively associated with said transfer members connected to said control circuit, the connections having control timers therein, a stop means for one of said transfer members connected to the circuit breaker associated therewith whereby when such circuit is closed the stop is actuated to position to coact with said transfer member, a circuit closing member operatively associated with one of the knotters and connected to said control circuit, its said connection having a timer therein, and a clutch control member operatively associated with said wire tensioning member whereby the clutch is disengaged by excessive stress upon the wire.

8. The combination with a spring coiling machine comprising a coiling means, knotters, and transfer members for transferring the springs step by step, of driving means including a clutch, a control means for said clutch including an electrically actuated member, a control circuit for said electrically actuated member, independent circuit closing means operatively associated with said transfer members connected to said control circuit, the connections having control timers therein, a stop means for one of said transfer members connected to the circuit breaker associated therewith whereby when such circuit is closed the stop is actuated to position to coact with said transfer member, a circuit closing member operatively associated with one of the knotters and connected to said control circuit, its said connection having a timer therein.

9. The combination with a spring coiling machine comprising a wire feed means including a wire tensioning member, a coiling means, knotters disposed to act successively on the springs, and transfer members operatively associated with said coiling means and knotters, of means for driving said machine including a clutch, an electrically actuated control member for said clutch, a contact plate connected to said control means and disposed in such relation on the machine that a dislocated spring will coact therewith to close the circuit, a circuit closing means connected to said control means arranged to be held normally open by the wire passing to the machine so that when the wire is exhausted the circuit is closed and the control means actuated, independent circuit closing means operatively associated with the mechanisms for performing the successive steps upon the spring connected to said control means, the connections having control timers therein which coact with the circuit closing means for closing the circuit to said control means, and a control member operatively associated with said clutch and wire tensioning member whereby the clutch is disengaged by excessive tension upon the wire.

10. The combination with a spring coiling machine comprising a wire feed means including a wire tensioning member, a coiling means, knotters disposed to act successively on the springs, and transfer members operatively associated with said coiling means and knotters, of means for driving said machine including a clutch, an electrically actuated control member for said clutch, a circuit closing means connected to said control means arranged to be held normally open by the wire passing to the machine so that when the wire is exhausted the circuit is closed and the control means actuated, independent circuit closing means operatively associated with the mechanisms for performing the successive steps upon the spring connected to said control means, the connections having control timers therein which coact with the circuit closing means for closing the circuit to said control means, and a control member operatively associated with said clutch and wire tensioning member whereby the clutch is disengaged by excessive tension upon the wire.

11. The combination with a spring coiling machine comprising a coiling means, knotters disposed to act successively on the springs, and transfer members operatively associated with said coiling means and knotters, of an electrically actuated control means, a contact plate connected to said control means and disposed in such relation on the machine that a dislocated spring will coact therewith to close the circuit, and independent circuit closing means operatively associated with the mechanisms for performing the successive steps upon the spring connected to said control means, the connections having control timers therein which coact with the circuit closing means for closing the circuit to said control means.

12. The combination with a spring coiling machine comprising a coiling means, knotters disposed to act successively on the springs, and transfer members operatively associated with said coiling means and knotters, of an electrically actuated control means, and independent circuit closing means operatively associated with the mechanisms for performing the successive steps upon the spring connected to said control means, the connections having control timers therein which coact with the circuit closing means for closing the circuit to said control means.

13. The combination with a spring coiling machine comprising a wire feed means, including a wire tensioning member, a coiling means, knotters disposed to act successively on the springs, and transfer members operatively associated with said coiling means for knotters, of means for driving said machine including a clutch, an electrically actuated control means for said clutch, a contact plate connected to said control means and disposed in such relation on the machine that a dislocated spring will coact therewith to close the circuit, a circuit closing means connected to said control means arranged to be held normally open by the wire passing to the machine so that when the wire is exhausted the circuit is closed and the control means actuated, and a control member operatively associated with said clutch and wire tensioning member whereby the clutch is disengaged by excessive tension upon the wire.

14. The combination with a spring coiling machine comprising a wire means, a coiling means, knotters disposed to act successively on the springs, and transfer members operatively associated with said coiling means and knotters, of means for driving said machine including a clutch, an electrically actuated control means for said clutch, a contact plate connected to said control means and disposed in such relation on the machine that a dislocated spring will coact therewith to close the circuit, and a circuit closing means connected to said control means arranged to be held normally open by the wire passing to the machine so that when the wire is exhausted the circuit is closed and the control means actuated.

15. The combination with a spring coiling machine comprising a wire feed means including a wire tensioning member, a coiling means, knotters disposed to act successively on the springs, and transfer members operatively associated with said coiling means and knotters, of means for driving said machine including a clutch, an electrically actuated control means for said clutch, a contact plate connected to said control means and disposed in such relation on the machine that a dislocated spring will coact therewith to close the circuit, and a control member operatively associated with the clutch and wire tensioning member whereby the clutch is disengaged by excessive tension upon the wire.

16. The combination with a spring coiling machine comprising a wire feed means including a wire tensioning member, driving means including a clutch, a control means for said clutch including an electrically actuated member, a control circuit for said electrically actuated member, a circuit closing means connected to said control circuit and arranged to be held normally open by the wire passing to the machine so that when the wire is exhausted the circuit closing means is actuated, and a clutch member operatively associated with said wire tensioning member whereby the clutch is disengaged by excessive stress upon the wire.

17. The combination in a spring coiling machine comprising a coiling means, first and second knotters, a locating means between said first and second knotters, a transfer member for transferring the springs from said coiler to said first knotter, a transfer member for transferring the springs from the first knotter to said locator, and a transfer member for transferring the springs from said locator of said second knotter, of a driving means for said machine including a clutch, an electrically actuated clutch control member, and contact plates connected to said control member and disposed in such relation to said coiler, knotters, locator and transfer members that a dislocated spring will coact therewith to close the circuit of said clutch control means.

18. The combination with a spring coiling machine comprising a coiling means, a knotter, a reciprocating transfer member for transferring the spring from the coiler to said knotter, an electrically actuated control means for said machine, a circuit closing means operatively associated with said transfer member and electrically connected to said control means, there being a timer in such connection.

19. The combination in machine comprising mechanism for performing successive operations upon a piece of work, an electrically actuated control means for said machine, a contact member electrically connected to said control means and disposed in such relation to the mechanisms that a dislocated piece of work will coact therewith to close the circuit of said control means, a circuit closing means operatively associated with said transfer means so that it is normally closed when the transfer member is in one position, the connection for such circuit closing means to the control means having a timer therein, and an electromechanical stop means for said transfer member connected to said circuit breaker whereby when the circuit is closed the stop is actuated to position to coact with said transfer member.

20. The combination in a machine comprising mechanism for performing successive operations upon a piece of work, an electrically actuated control means for said machine, a contact member electrically connected to said control means and disposed in such relation to the mechanisms that a dislocated piece of work will coact therewith to close the circuit of said control means, a circuit closing means operatively associated with said transfer means so that it is normally closed when the transfer member is in one position, the connection for such circuit closing means to the control means having a timer therein.

21. The combination in a machine comprising mechanism for performing successive operations upon a piece of work, an electrically actuated control means for said machine, a circuit closing means operatively associated with said transfer means so that it is normally closed when the transfer member is in one position, the connection for such circuit closing means to the control means having a timer therein, and an electromechanical stop means for said transfer member connected to said circuit breaker whereby when the circuit is closed the stop is actuated to position to coact with said transfer member.

22. The combination with a machine comprising mechanisms for performing successive operations upon a piece of work and a transfer member for transferring the work from one mechanism to another, an electrically actuated control means, a contact member connected to said control member and disposed so that a dislocated piece of work will coact therewith to actuate said control means, a circuit closing means operatively associated with said transfer member and connected to said control means, the connections having a control timer therein, and an electromagnetic stop means for said transfer member connected to the circuit closing means whereby when such circuit is closed the stop is actuated to position to coact with said transfer member.

23. The combination with a machine comprising mechanisms for performing successive operations upon a piece of work and a transfer member for transferring the work from one mechanism to another, an electrically actuated control means, a contact member connected to said control member and disposed so that a dislocated piece of work will coact therewith to actuate said control means, a circuit closing means operatively associated with said transfer member and connected to said control means, the connections having a control timer therein.

24. The combination with a machine comprising mechanisms for performing successive operations upon a piece of work and transfer member for transferring the work from one mechanism to another, an electrically actuated control means, a circuit closing means operatively associated with said transfer member and connected to said control means, the connections having a control timer therein, and an electromagnetic stop means for said transfer member connected to the circuit closing means whereby when such circuit is closed the stop is actuated to position to coact with said transfer member.

25. The combination with a machine comprising mechanisms for performing successive operations upon a piece of work and a transfer member for transferring the work from one mechanism to another, an electrically actuated control means, and a circuit closing means operatively associated with said transfer member and connected to said control means, the connections having a control timer therein.

26. The combination with a machine comprising mechanisms for performing successive operations upon a piece of work and a transfer member for transferring the work from one mechanism to another, an electrically actuated control means, and a contact member connected to said control member and disposed so that a dislocated piece of work will coact therewith to actuate said control means.

27. The combination with a machine of driving means therefor, an electrically actuated control means for said driving means, a contact member electrically connected to said control means and disposed on the machine so that a dislocated piece of work will close the circuit of said control means to actuate the same, a circuit closing means for said control means operatively associated with a working part of the machine, and electrical connections from said circuit closing means to said control means, there being a timer in such connection so that upon the failure of the machine part to function normally the control means is actuated.

28. The combination with a machine, of driving means therefor, an electrically actuated control means for said driving means, a circuit closing means for said control means operatively associated with a working part of the machine, and electrical connections from said circuit closing means to said control means, there being a timer in such connection so that upon the failure of the machine part to function normally the control means is actuated.

29. The combination of a driven shaft, a driving pulley rotatable on said shaft, a clutch for connecting said pulley to said shaft, a planetary gearing comprising a member rotatable with said shaft, planetary pinions on said member, a clutch drum rotatable on said shaft, gears on said pulley clutch drum coacting with said planetary pinions, clutch shoes coacting with said drum, an adjusting screw for said clutch shoes provided with a pinion, a reciprocating control bar provided with a rack coacting with said pinion and operatively connected to said pulley clutch, a cam on said shaft, a pivotally mounted tripping member connected to said bar and provided with a tripping bolt adapted to coact with said cam, said cam being provided with a cam projection for returning said bolt to its retracted position, a latch for holding said tripping bolt in retracted position, an electromagnet for disengaging said latch, and means connected to said bar for manually shifting the same.

30. The combination of a driven shaft, a driving pulley rotatable on said shaft, a clutch for connecting said pulley to said shaft, a reciprocating control bar, operatively connected to said pulley clutch, a cam on said shaft, a pivotally mounted tripping member connected to said bar and provided with a tripping bolt adapted to coact with said cam, said cam being provided with a cam projection for returning said bolt to its retracted position, a latch for holding said tripping bolt in retracted position, an electromagnet for disengaging said latch, and means connected to said bar for manually shifting the same.

31. The combination of a driven shaft, a driving pulley rotatable on said shaft, a clutch for connecting said pulley to said shaft, a planetary gearing comprising a member rotatable with said shaft, planetary pinions on said member, a clutch drum rotatable on said shaft, gears on said pulley clutch drum coacting with said planetary pinions, clutch shoes coacting with said drum, an adjusting screw for said clutch shoes provided with a pinion, and a control bar provided with a rack coacting with said pinion and operatively connected to said pulley clutch.

32. The combination of a driven shaft, a driving pulley rotatable on said shaft, a clutch for connecting said pulley to said shaft, a speed reducing gearing connecting said shaft and pulley, a control member for said speed gearing, and said clutch, a cam on said shaft, a pivotally mounted tripping member connected to said bar and provided with a tripping bolt adapted to coact with said cam, said cam being provided with a cam projection for returning said bolt to its retracted position, a latch for holding said tripping bolt in retracted position, and an electromagnet for disengaging said latch.

33. The combination of a driven shaft, a driving pulley rotatable on said shaft, a clutch for connecting said pulley to said shaft, a speed reducing gearing connecting said shaft and pulley, a control member for said speed gearing and said clutch, a cam on said shaft, a pivotally mounted tripping member connected to said bar and provided with a tripping bolt adapted to coact with said cam, said cam being provided with a cam projection for returning said bolt to its retracted position, a latch for holding said tripping bolt in retracted position, and means for automatically disengaging said latch.

34. The combination with a driven shaft, a driving pulley rotatable on said shaft, a clutch for connecting said pulley to said shaft, a speed reducing gear connecting said shaft and pulley, a control member for said speed gearing and said clutch, and an electromechanical means for actuating said control member comprising a cam on said shaft, a tripping member adapted to coact therewith, a latch for holding said tripping member in retracted position, and an electromagnet for disengaging said latch.

35. The combination with a driven shaft, a driving pulley rotatable on said shaft, a clutch for connecting said pulley to said shaft, a speed reducing gear connecting said shaft and pulley, a control gear connecting said shaft and pulley, a control member for said speed gearing and said clutch and an electromechanical means for actuating said control member.

36. The combination with a driven shaft, a driving pulley rotatable on said shaft, a clutch for connecting said pulley to said shaft, a control member for said clutch, and an electromechanical means for actuating said control member, comprising a cam on said shaft, a tripping member adapted to coact therewith, a latch for holding said tripping member in retracted position, and an electromagnet for disengaging said latch.

37. The combination with a driven shaft, a driving pulley rotatable on said shaft, a clutch for connecting said pulley to said shaft, and an electromechanical means for actuating said control member comprising, a cam on said shaft, a tripping member adapted to coact therewith, a latch for holding said tripping member in retracted position, and an electromagnet for disengaging said latch.

38. The combination of a driving clutch, a control member for said clutch, and an electromechanical means for actuating said control member, comprising a cam, a tripping member adapted to coact therewith, a latch for holding said tripping member in retracted position, and an electromagnet for disengaging said latch.

39. The combination of a driving clutch, a control member for said clutch, and an electromechanical means for actuating said control member, comprising a tripping member, a latch for holding said tripping member in retracted position, and an electromagnet for disengaging said latch.

In witness whereof, I have hereunto set my hand and seal.

BERT L. VAN ORMAN. [L. S.]